United States Patent
Kim

(10) Patent No.: US 8,321,289 B2
(45) Date of Patent: Nov. 27, 2012

(54) METHOD FOR MAKING USE OF SITE ACTIVITY INDEX AND A SYSTEM THEREOF

(75) Inventor: Ki-Sung Kim, Seoul (KR)

(73) Assignee: NHN Corporation, Seongnam-si (KR)

( * ) Notice: Subject to any disclaimer, the term of this patent is extended or adjusted under 35 U.S.C. 154(b) by 1628 days.

(21) Appl. No.: 11/575,491

(22) PCT Filed: Oct. 7, 2005

(86) PCT No.: PCT/KR2005/003331

§ 371 (c)(1),
(2), (4) Date: Mar. 16, 2007

(87) PCT Pub. No.: WO2006/080720

PCT Pub. Date: Aug. 3, 2006

(65) Prior Publication Data

US 2007/0294136 A1    Dec. 20, 2007

(30) Foreign Application Priority Data

Oct. 7, 2004  (KR) ..................... 10-2004-0079869

(51) Int. Cl.
*G06Q 30/00*  (2006.01)
(52) U.S. Cl. ...................................... 705/26.1; 705/27.1
(58) Field of Classification Search ............ 705/26, 705/27
See application file for complete search history.

(56) References Cited

U.S. PATENT DOCUMENTS

| 6,594,640 | B1 * | 7/2003 | Postrel ........................ 705/14.27 |
| 2003/0078102 | A1 * | 4/2003 | Okita et al. ..................... 463/42 |
| 2003/0083943 | A1 * | 5/2003 | Adams et al. ................... 705/14 |
| 2004/0177007 | A1 * | 9/2004 | Van Luchene .................. 705/26 |

FOREIGN PATENT DOCUMENTS

| KR | 2000-0012242 | 3/2000 |
| KR | 2001-0044628 | 6/2001 |
| KR | 2001-0085169 | 9/2001 |
| KR | 2001-0102755 | 11/2001 |
| KR | 2002-0064055 | 8/2002 |
| KR | 2002-0073887 | 9/2002 |
| KR | 2003-0086532 | 11/2003 |

OTHER PUBLICATIONS

"Thumbworks Continues to Introduce Big Brands to BREW™ -Enabled Handsets," PR Newswire, May 12, 2004; Proquest #635786581, 3pgs.*
English language abstract of Korean Publication No. 2000-0012242.
English language abstract of Korean Publication No. 2001-0044628.

(Continued)

*Primary Examiner* — Robert M. Pond
(74) *Attorney, Agent, or Firm* — H.C. Park & Associates, PLC

(57) ABSTRACT

Provided are a method and a system for applying site activity indexes by a site activity index applying system connected to a plurality of user terminals through the Internet. In one embodiment, the method includes checking whether a user who is connected to a web site through the Internet desires to buy a game item, checking whether to use the user's site activity indexes so as to buy the game item, checking whether the user possesses site activity indexes, and exchanging the site activity indexes with game items when the user possesses the site activity indexes. With the method and system for applying site activity indexes user loyalty and game participation may be increased.

18 Claims, 10 Drawing Sheets

OTHER PUBLICATIONS

English language abstract of Japanese Publication No. 2001-0085169.

English language abstract of Japanese Publication No. 2001-0102755.

English language abstract of Japanese Publication No. 2002-0064055.

English language abstract of Japanese Publication No. 2002-0073887.

English language abstract of Japanese Publication No. 2003-0086532.

* cited by examiner

METHOD FOR MAKING USE OF SITE ACTIVITY INDEX AND A SYSTEM THEREOF

CROSS-REFERENCE TO RELATED APPLICATION

This application is a U.S. national phase application of PCT International Application No. PCT/KR2005/0003331, filed Oct. 7, 2005, which claims priority of Korean Patent Application No. 2004-0079869, filed Oct. 7, 2004, the contents of which are incorporated herein by reference in their entirety.

BACKGROUND

1. Technical Field

The present invention relates to a method and a system for applying site activity indexes. More specifically, the present invention relates to a method and a system for acquiring site activity indexes from web site activities or usage of charged/non-charged services on the Internet and applying the site activity indexes to charged games.

2. Description of the Related Art

As the Internet has recently spread, electronic commerce and information exchange for people all over the world has increased on the Internet. In particular, development of the Internet has enabled the provision of various categories of information to many users irrespective of their residential areas. Further, portal sites for providing information search services or community services have been developed and used.

Users have received various pieces of information through the portal sites according to the development of the portal sites, and they have easily exchanged information with other users through the community services. When the portal sites generate communities in cyber space and obtain more registered users and hit numbers of homepages, they can increase advertisement income and marketing income by application of user information. Hence, the portal sites have developed methods so that as many users as possible may perform activities on their sites. Thus, the portal sites have used the marketing strategy of providing cyber money to the user when the user executes electronic transactions on corresponding sites, for the purpose of promoting usage of the sites.

However, since the above-noted cyber money is electronic money that can be converted into real money, it may generate suspicion, such as a tie-in sale of money, when cyber money is assigned to the user's purchase. Also, illegal transactions for reserving a further amount of cyber money may be executed because the cyber money can be exchanged with real money.

Accordingly, mileages that are not exchangeable with real money are assigned to users according to their activities generated on the portal sites. In this instance, the user activities available for mileages include an activity for causing settlement (e.g., a transaction such as making a purchase), a specific activity for watching advertisements, an activity for joining events, an activity for registering with cooperating sites, and an activity for using services of the cooperating sites, and may further include an activity for transmitting and receiving mail through the site and an activity for logging into the site by the users.

FIG. 1 shows a configuration diagram of a conventional mileage providing system through the Internet 400, the system including a plurality of user terminals 100, a portal site 200, and a plurality of site servers 300.

Referring to FIG. 1, the Internet mileage providing system is realized in the portal site 200 and is connected to the user terminals 100 and the site servers 300 through a network (substantially the Internet 400) including a telephone network, the Internet, and a wireless communication network.

The user terminals 100 are communication devices for accessing the mileage providing system realized in the portal site 200 through the Internet 400, and include a plurality of user terminals 110, 120, and 130.

The site servers 300 include servers 310, 320, and 330 of sites for providing various services through the Internet 400, and they represent servers of sites that are cooperating with the mileage providing system realized in the portal site 200 and provide services.

The system connected to the user terminals 100 through the Internet 400 and providing/exchanging mileages to/with the user includes an interface server 210, an authentication server 220, a processing server 230, and a database server 240.

The database server 240 includes a user database 241, a mileage database 242, and a cyber money database 243.

The user database 241 stores information on users who receive services through the mileage providing system and the mileage database 242 stores information on the mileages assigned to the users. Also, the cyber money database 243 stores information on the cyber money possessed by respective users.

The processing server 230 for providing and exchanging mileages based on the information stored in the database server 240 includes a service provider 231 for providing a plurality of services including transactions to the user, a mileage provider 232 for providing mileages according to the user's states and degrees of participating in the services provided through the service provider 231, and a cyber money provider 233 for providing cyber money to the user.

In this instance, the service provider 231 includes a transaction service unit 231-1 for selling and buying goods, an event provider 231-2 for providing a plurality of events including advertisements to the user, and a cyber money service unit 231-3 for providing exclusive services (e.g., games) based on cyber money.

The authentication server 220 performs users' membership registration to the system and performs membership authentication based on the information stored in the user database 241. Also, the interface server 210 controls access of the user terminals 100 through the Internet 400, converts various pieces of information provided by the respective servers into data that satisfy a communication standard, and provides the data to the user terminals 100. Additionally, the interface server 210 can receive information from the user terminals 100 through the Internet 400 and provide the information to the respective servers.

FIG. 2 shows an operational flowchart of a conventional method for acquiring mileages on the Internet.

Referring to FIG. 2, in a conventional method for acquiring mileages on the Internet, a user inputs an ID and a password to log in to the system in step S201 and then uses a service provided by the system. Next, the service provider 231 of the processing server 230 shown in FIG. 1 provides a plurality of services to the user according to the user's request after checking the user's right to use the service in steps S202 and S203.

For example, when the user requests a transaction service for buying predetermined goods (e.g., contents such as avatars, lottery, and products) sold by the system, the transaction service unit 231-1 performs a transaction with the user in step S204, and transmits corresponding results to the mileage provider 232. That is, the transaction service unit 231-1 provides settled money, a user ID, and a settlement date on the sold goods according to the transaction with the user to the mileage provider 232 in step S205.

The mileage provider 232 provides a predetermined percentage of mileages corresponding to the settled money to the user in step S206, records an accumulation format for indicating that the mileages are given according to the usage of the transaction service corresponding to the user ID of the mileage database 242, and records information including the provided mileages and the total amount of mileages given to the user.

In addition to the above-noted service usage, when the user clicks an advertisement provided to the user terminal 100 by the event provider 231-2 and checks it, or the user participates in various events in step S207, the event provider 231-2 provides the corresponding user's ID and information on the categories of the events in which the user participated to the mileage provider 232. The mileage provider 232 provides predetermined mileages that are established depending on the categories of events to the user in step S208, and corresponding information is stored in the mileage database 242.

When the user accesses a site server 200 cooperating with the mileage providing system and registers himself as a member in step S209, the corresponding site server 300 provides registered user information (e.g., a residence number) to the mileage provider 232. In this instance, the mileage provider 232 searches the user database 241, and when the mileage provider 232 finds the information, that is, when the user is a member of the system, the mileage provider 232 provides predetermined mileages caused by the membership registration of the cooperating site to the user in step S210, and corresponding information is stored in the mileage database 242. The mileages can also be provided to the user when the user uses the service provided by the site server 300.

Therefore, the user receives mileages that are inconvertible into money according to the user's various activities based on the mileage providing system, and in particular, the system can prevent the suspicion of tie-in sales since the mileages are inconvertible into money in the usage of transactions.

There are several prior art patents relating to the usage of mileages in electronic games and commerce. For example, in Korean Application no. 2000-14659 filed on Mar. 22, 2000 entitled "Method for Using Mileages in Games," a method of using mileages in an electronic game is disclosed.

In detail, the prior art relates to a method for reusing mileages in games in order to promote the Internet electronic commerce field using a mileage system and the Internet advertisement marketing field, in which one netizen plays a game with another netizen and provides or receives mileages to/from him depending on the cases in which the netizen wins or loses the game, and hence netizens aggressively use the mileage based Internet service providers since they can effectively use the mileages even if the amount of mileages may be very small.

In Korean Application no. 2001-4653 filed on Jan. 31, 2001 entitled "Method for Using Mileages Generated in Electronic Commerce," it is disclosed that a user acquires mileages through an electronic transaction, bets the mileages on a game of the same site, and plays the game, and when the user gathers a predetermined amount of mileages in the game, he goes shopping again with the mileages.

In detail, a web site having an electronic transaction corner and a game corner is generated on an information communication network, and when a user accesses the web site, the user is registered as a member, and when the member executes an electronic transaction, mileages corresponding to a predetermined percentage of the price are reserved to the user, and the user selectively takes the mileages to join and play the game of the same site and selectively performs electronic transactions at the same site by using the mileages that are further reserved through the game corner.

Further, in Korean Application no. 2003-72813 filed on Oct. 18, 2003 entitled "Method for Consuming Mileages Using Games," it is disclosed that online mileages or equivalent valuable means are converted into game money, a game is played by using the game money, a gamer is controlled to acquire items when a specific event occurs during the execution of the game, and the game money is settled when the game is over.

In detail, mileages having the same values as cash are converted into game money, the gamer is controlled to play the game using the game money, he is controlled to acquire items when a specific event occurs during the game, and he is controlled to make a purchase by using the items so that winning and losing game money may not be gambling and the mileages of companies that give excessive mileages (e.g., airlines, communication service providers, security corporations, and the OK cash bag service providing company) can be consumed with a small cost.

However, in the conventional mileage providing method, the term of mileages strongly implies possessions that are generated by reserving a predetermined part of services, such as airline mileages. Actually, airline mileages are generated by reserving a predetermined amount of their charged prices so that they are appropriated as debts, and 50% of the total reserves are to be stored in cash.

Further, as to other prior art, disclosed are Korean Application no. 2000-14659 and no. 2001-4653 in which netizens acquire mileages from Internet transactions, they play games using the mileages, and they perform electronic transactions by using the mileages that are further reserved from the game corner. Accordingly, the mileages function as cyber money, and since the cyber money is convertible into cash, illegal transactions for reserving more cyber money may be executed. Also, Korean Application no. 2003-72813 problematically aims at the above-noted mileages that may be considered to be possessions since the mileages that have the equivalent values of cash and are provided by airlines, communication service providers, security corporations, and the OK cash bag service providing company are converted into game money.

SUMMARY

It is an advantage of the present invention to provide a site using an index method and system for clearly separating a free site using index reserving service and a site activity index using service, applying the site activity index using service to games, and increasing the site activity index using games.

It is another advantage of the present invention to provide a site activity index applying method and system for controlling conversion of free site activity indexes and various charged game money, efficiently performing outward events, and thus applying the site activity indexes in various manners.

It is still another advantage of the present invention to provide a site activity index applying method and system for providing means other than cash that are applicable to various schemes that use paid games.

It is still yet another advantage of the present invention to provide a site activity index applying method and system for providing means other than cash when a new game including paid components is introduced.

It is another further advantage of the present invention to provide a site activity index applying method and system applicable to all activities including free activities in the site and thus applicable to acquisition of site activity indexes.

One embodiment of the present invention provides a method for applying site activity indexes by a site activity index applying system connected to a plurality of user terminals through the Internet. The method includes checking whether a user who is connected to a web site through the Internet desires to buy a game item, checking whether to use the user's site activity indexes so as to buy the game item, checking whether the user possesses the site activity indexes, and exchanging the site activity indexes with game items when the user possesses the site activity indexes.

Another embodiment of the present invention provides a method for applying site activity indexes by a site activity index applying system connected to a plurality of user terminals through the Internet. The method includes checking whether a user who is connected to a web site through the Internet selects joining a charged game, checking whether to use the user's site activity indexes so as to join the charged game, checking whether the user possesses the site activity indexes, converting the site activity indexes into game credits when the user possesses the site activity indexes, and controlling the user to join the selected game with the converted game credits.

Still another embodiment of the present invention provides a system for applying site activity indexes, where the system is connected to a plurality of users through the Internet. The system includes a service provider for providing a plurality of services including transactions to the user, a site activity index provider for providing site activity indexes according to the user's activity results of using the services, a game server for executing the game according to the game logics defined for the respective games, a database server for storing information on the users, the site activity indexes, and the games, and a game item buying unit for controlling a user to buy the game item used in the game provided by the game server by using the site activity indexes.

According to the present invention, loyalty and concentration on the game by users are increased and requirements for the site activity indexes to be used for the game are increased since the users enjoy the game with the charge-free site activity indexes. Also, the site activity indexes can be substantially chargeable by using paid services from which the user can acquire a large amount of site activity indexes.

DETAILED DESCRIPTION

Figure 1:
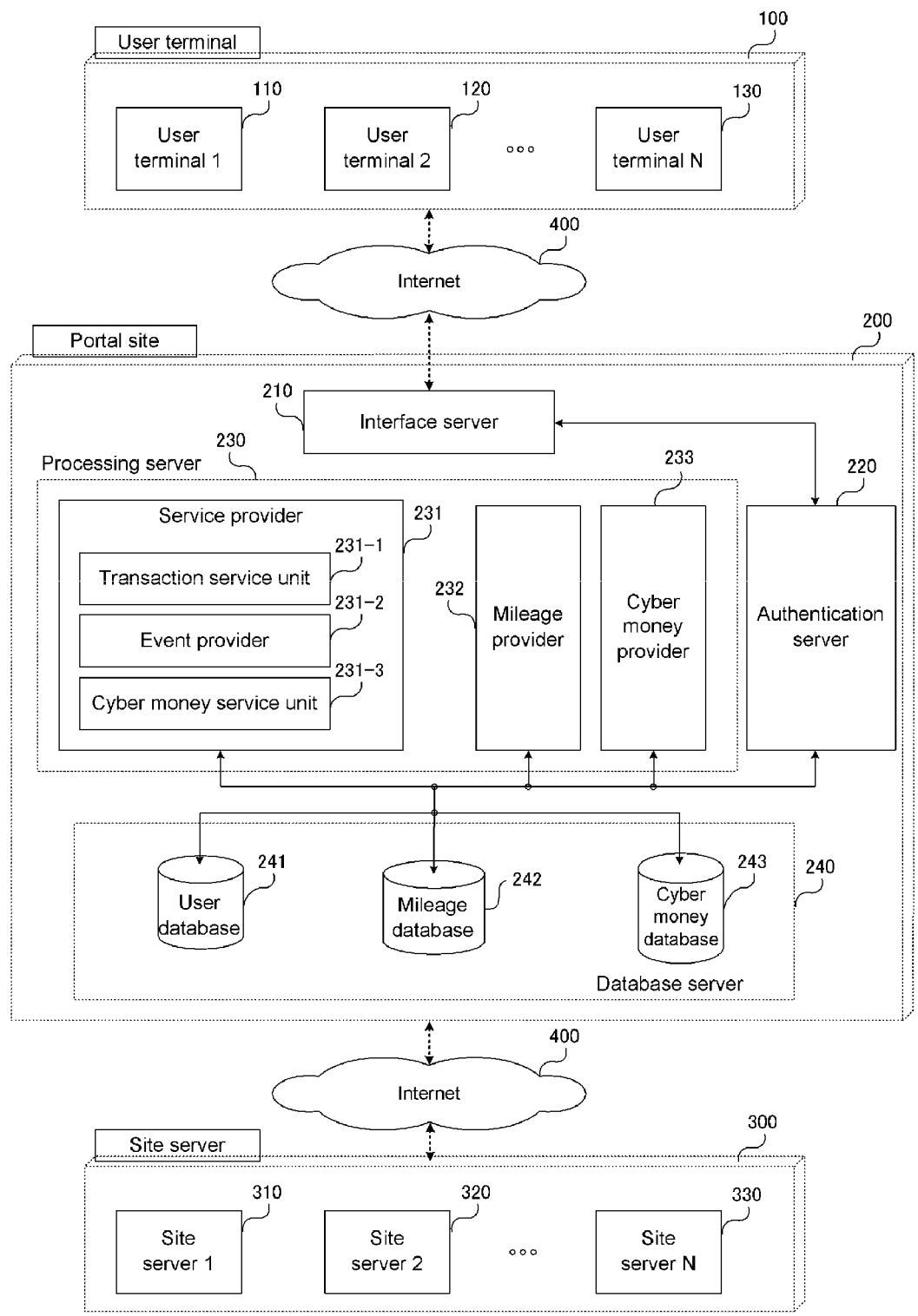
FIG. 1 shows a configuration diagram of a conventional mileage providing system on the Internet.
Figure 2:
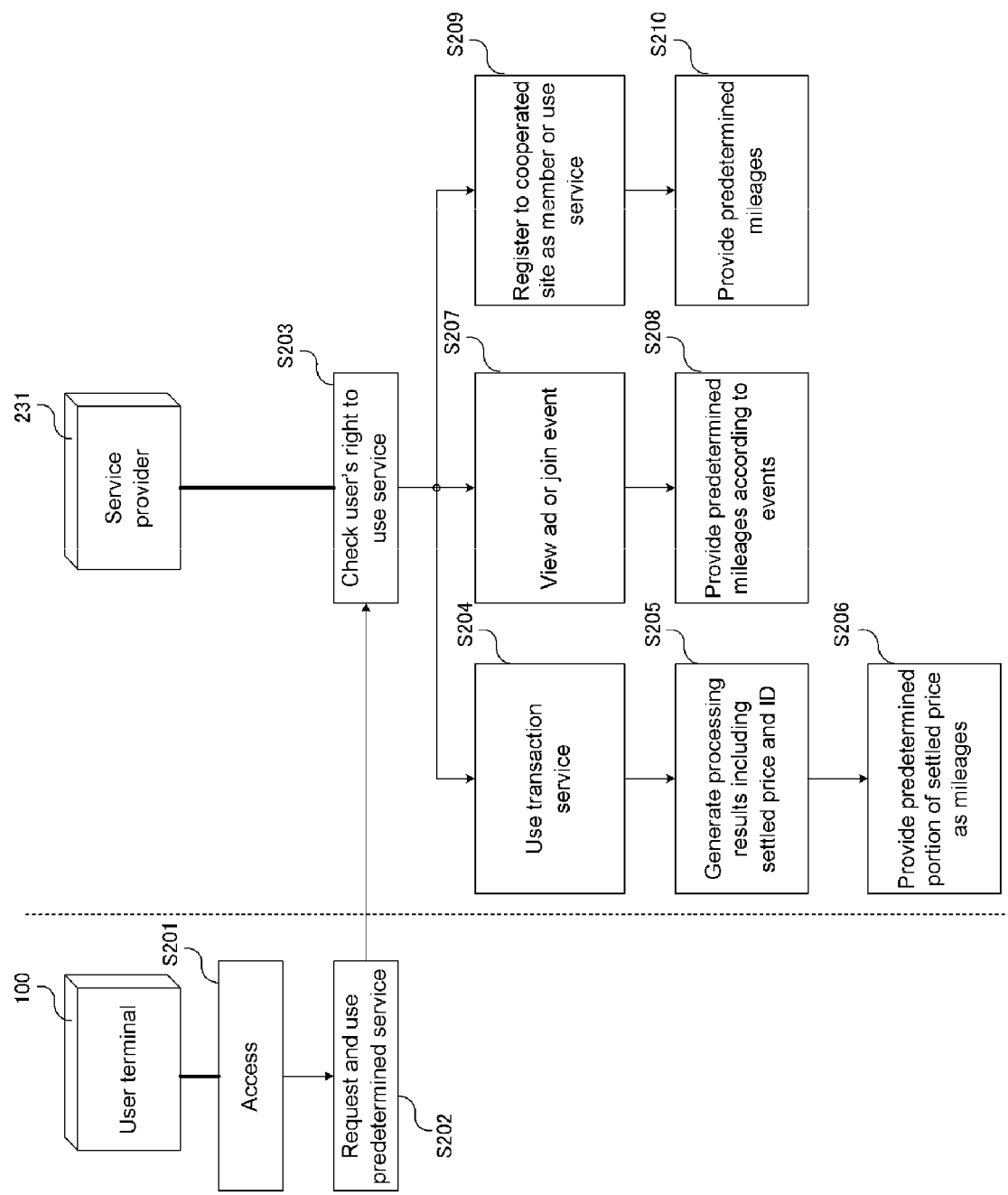
FIG. 2 shows an operational flowchart of a conventional method for acquiring mileages on the Internet.

In the following detailed description, embodiments of the present invention have been shown and described with reference to the drawings. However, as will be realized, the invention is capable of modification in various obvious respects, all without departing from the invention. Accordingly, the drawings and description are to be regarded as illustrative in nature, and not restrictive. To clarify the present invention, parts which are not described in the specification are omitted from the drawings, and parts for which similar descriptions are provided have the same reference numerals.

The conventional term of mileages strongly implies possessions that are generated by reserving a predetermined part of services, such as airline mileages. Actually, airline mileages are generated by reserving a predetermined amount of their charged prices so that they are appropriated as debts, and 50% of the total reserves are to be stored in cash according to the law.

Also, in the embodiments of the present invention, the term "site activity index" can be substituted for the term "mileage." The term "site activity index" typically represents possessions with property that are provided for free by the portal sites and that can be eliminated according to provisions after a term of validity.

In detail, the site activity index includes numerical activity indexes provided for free to the user as rewards for activities participated in on the web site, scores obtained after winning a game, and indexes generated by measuring the degrees of using charged/non-charged services. Accordingly, the site activity index is given to the user without charges differing from cash, it is given according to advertisements, it allows the user to use some charged services (e.g., item services) other than the whole charges on the paid service sites, and it is applicable to buying game items.

Figure 3:
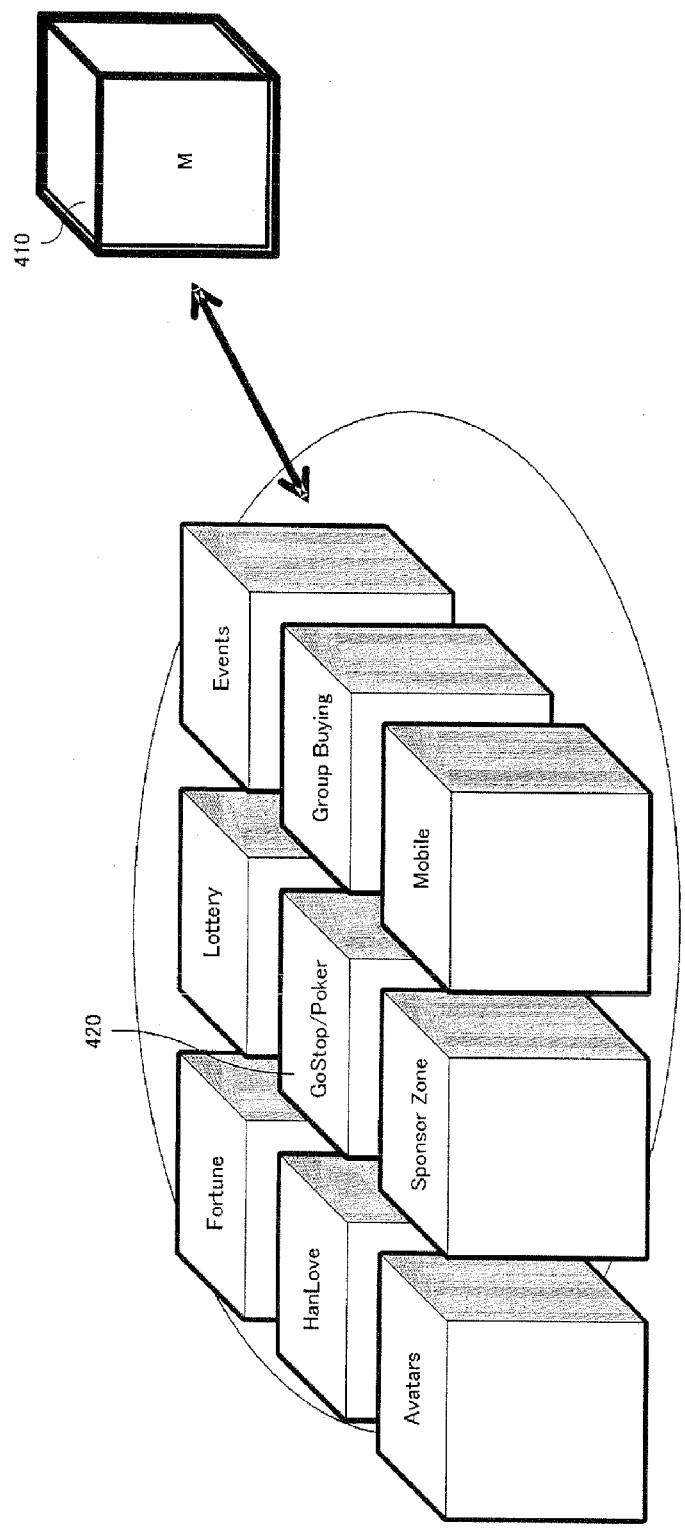
FIG. 3 shows a schematic diagram for describing a general process for reserving site activity indexes on the Internet.

FIG. 3 shows a schematic diagram for describing a general process for reserving site activity indexes on the Internet.

Referring to FIG. 3, the process for reserving site activity indexes on the Internet will be described using the example of site activity indexes provided by Han Game (www.hangame.com).

That is, in Han Game (www.hangame.com), the activity indexes 410 are reserved according to the users' activities including fortune, lottery, events, HanLove, Go-Stop card game/poker 420, group buying, avatars, sponsor zones, and mobiles.

In this instance, the users' activities for providing the site activity indexes 410 include settlement generating activities (e.g., transactions of making a purchase at the corresponding web site), specific activities such as viewing advertisements at the corresponding web site, activities of joining events at the corresponding web site, activities of registering memberships to sites that are cooperating with the corresponding site, and activities of using services of the cooperating sites, and may further include activities of transmitting and receiving mail through the corresponding site and activities of the users' logging in for using the site.

Figure 4:
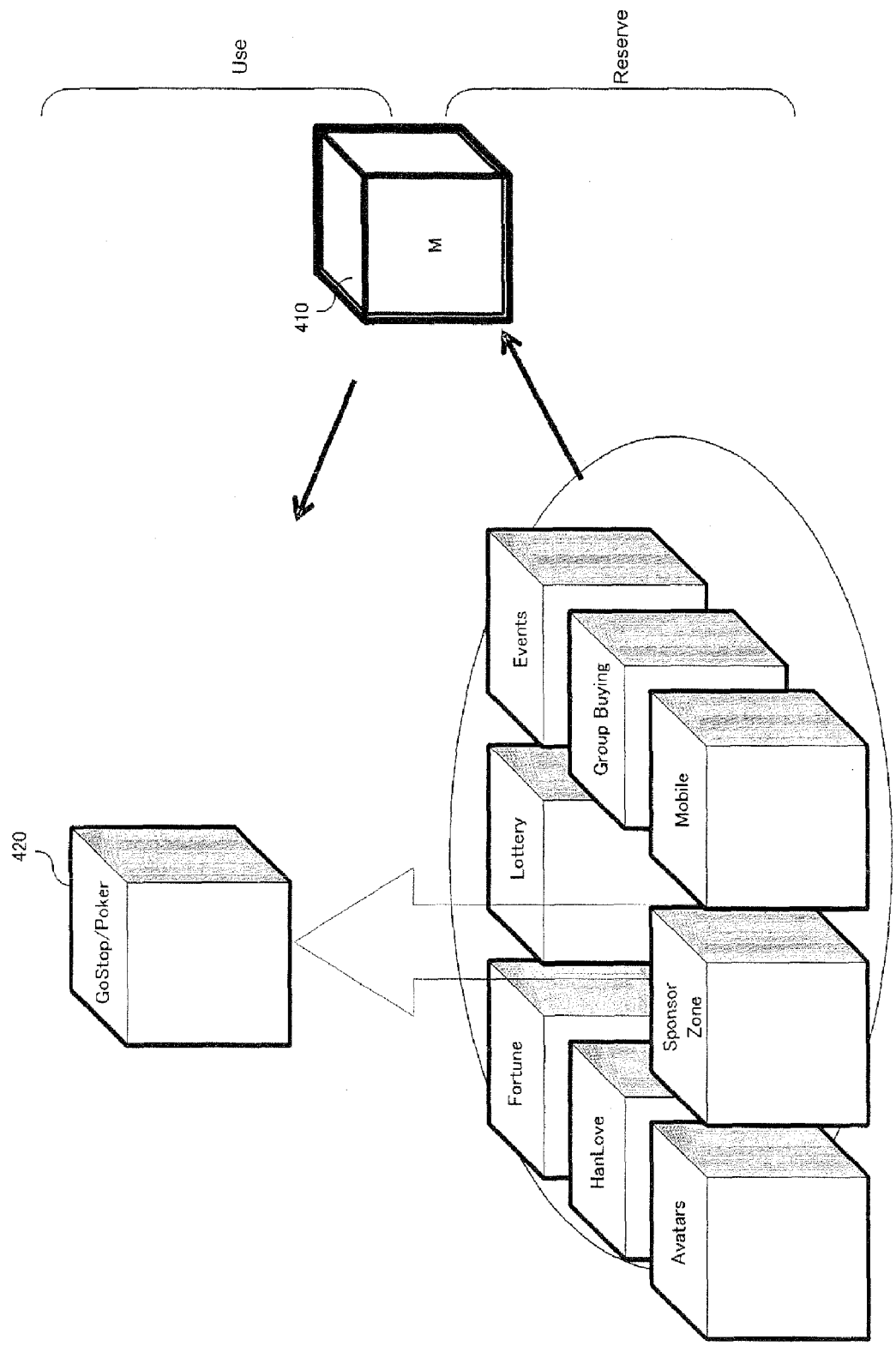
FIG. 4 and FIG. 5 show conceptual diagrams for describing a process for reserving and using site activity indexes according to an embodiment of the present invention.
Figure 5:
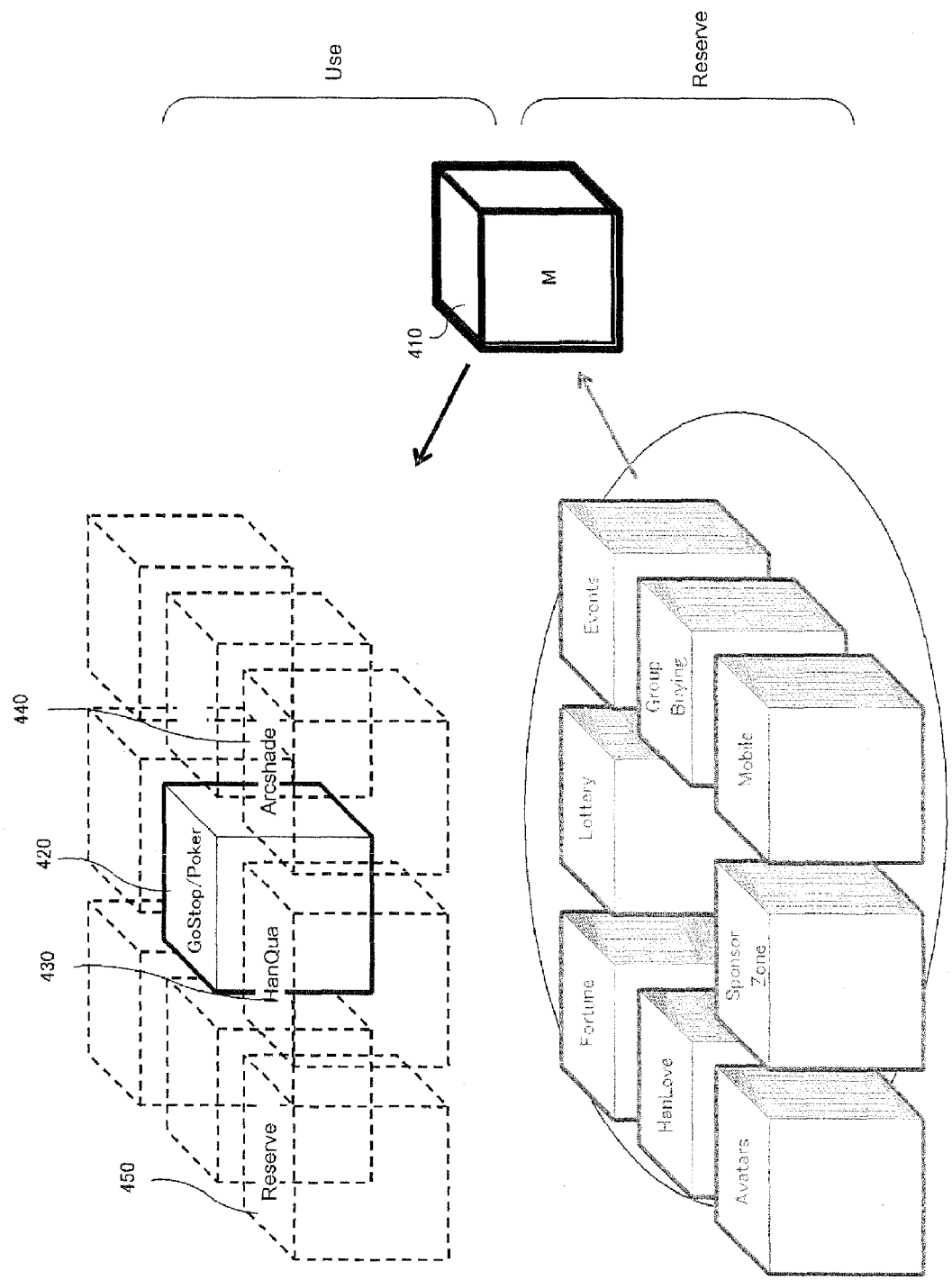

FIG. 4 and FIG. 5 show conceptual diagrams for describing a process for reserving and using site activity indexes according to an embodiment of the present invention. FIG. 4 shows that the user uses the reserved site activity index 410 in the Go-stop/poker 420 to acquire game credits and join the Go-stop/poker 420, and FIG. 5 shows that the user acquires game credits by using the reserved site activity index 410 and then joins paid games including HanQua 430, ArcShade 440, and Game Room 450. In this instance, HanQua 430, ArcShade 440, and Game Room 450 are paid games provided by Han Game (www.hangame.com).

Figure 6:
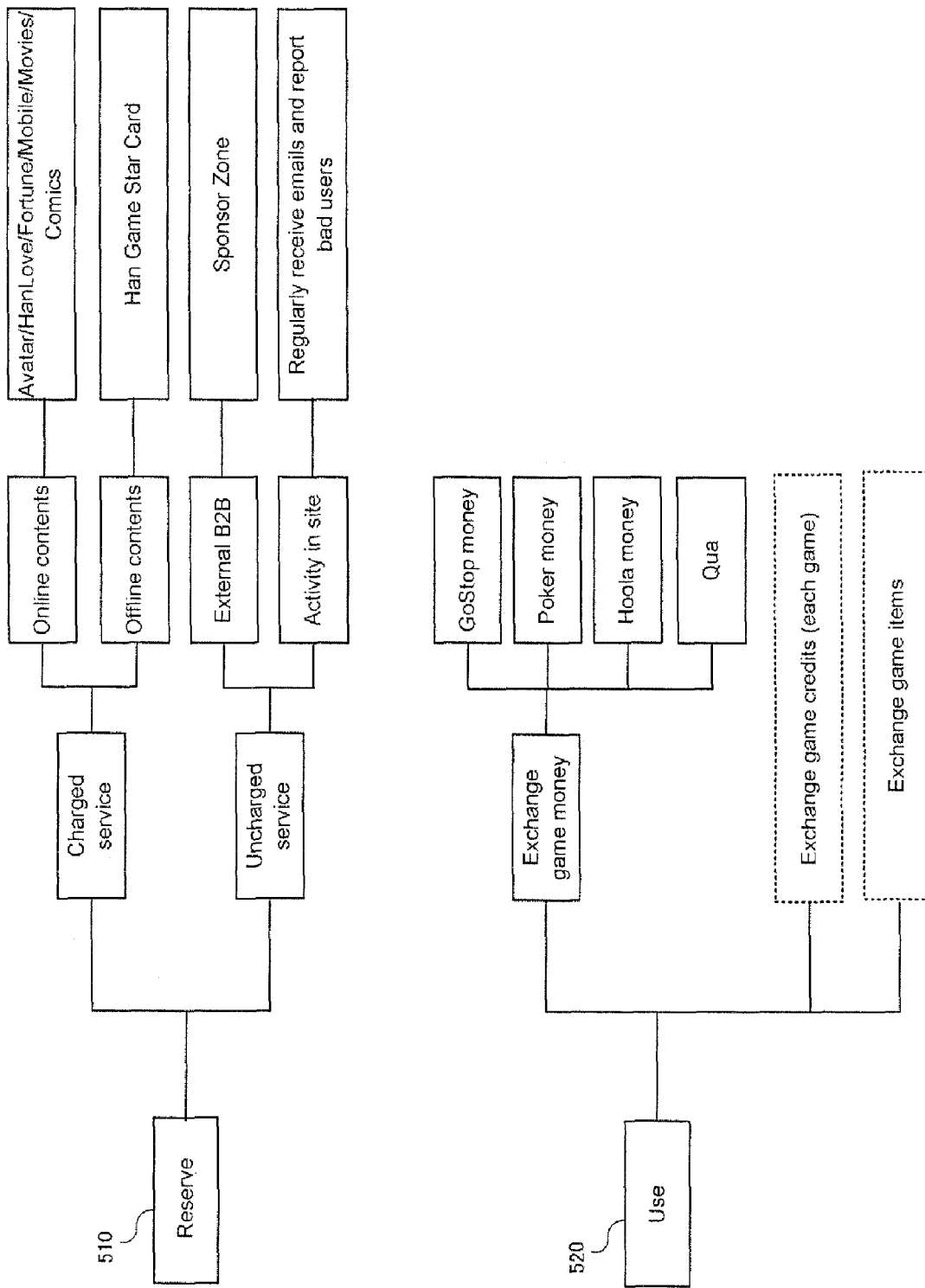
FIG. 6 shows exemplified reserve and usage of site activity indexes according to an embodiment of the present invention.

FIG. 6 shows exemplified reserve and usage of site activity indexes according to an embodiment of the present invention.

Referring to FIG. 6, the site activity indexes are reserved through a charged service and a non-charged service (510). In this instance, the charged services include online contents such as avatars, HanLove, fortune, mobiles, movies, and comics, and offline contents provided by using Han Game star cards. Also, the non-charged services include external B2B activities such as the sponsor zone and internal activities of regularly receiving emails and reporting bad users. Having used the above-noted charged or non-charged service, the user receives a predetermined portion of site activity indexes from the portal site, and the acquired activity indexes are reserved.

The usage of site activity indexes allows the user to join charged games by using the site activity indexes such as exchanging game items, converting game money, and exchanging game credits (520). Substantially, in the embodiment, the user is allowed to use part of the charged services other than the whole charge by using the site activity indexes at the charged service sites, and the game using site activity indexes can be extended by clearly separating the site activity index reserving service and the site activity index using service.

Figure 7:
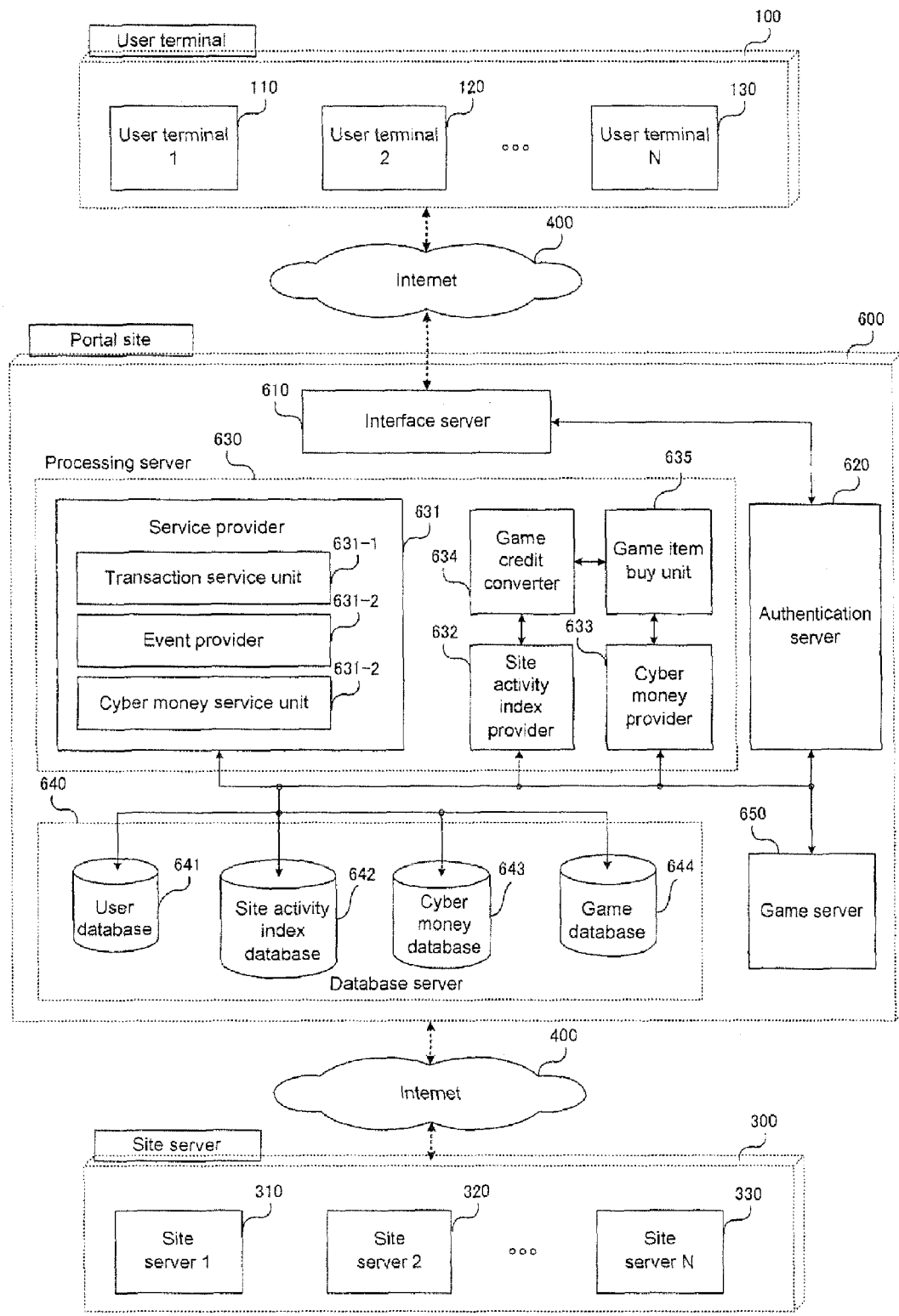
FIG. 7 shows a schematic diagram of a site activity index applying system according to an embodiment of the present invention.

FIG. 7 shows a schematic diagram of a site activity index applying a system according to an embodiment of the present invention. A plurality of user terminals 100, a portal site 600, and a plurality of site servers 300 are connected through the Internet 400 to provide site activity indexes.

Referring to FIG. 7, the site activity index applying system according to the embodiment of the present invention is realized in the portal site 600, and is connected to the user terminals 100 and the site servers 300 through a network including a telephone network, the Internet, and a wireless communication network, and substantially through the Internet 400.

The user terminal 100 is a communication device for accessing the site activity index providing system realized in the portal site 600 through the Internet 400, and includes a plurality of user terminals 110, 120, and 130. For example, the user terminal 100 includes various communication devices including a cable telephone, a mobile communication terminal, a computer, and an Internet TV. Therefore, the user can conveniently and quickly access the system 100 by using PC communication, the Internet, the wireless Internet, or the telephone network.

Also, the user terminal 100 may include a hardware unit (not shown) having one or more of a central processing unit (CPU), a main memory, a hard disk drive, an input/output device, a graphic card, a LAN card, and a high-speed Internet terminal (e.g., an ADSL modem), an operating system (OS) program such as Windows2000 or WindowsXP of Microsoft, and a web browser such as the Internet Explorer, and it is connected to a web site having a specific URL address through the Internet. The user terminal 100 installs cookie data for identifying membership when the user has joined the web site, and a game client, which is a kind of program when the user becomes a user of a predetermined game provided by the web site. The game client installed in the user terminal 100 performs functions on configuration of general network games. For example, the game client has various default graphic data required for TCP/IP based games, game default files with defined rules, and update files. Further, the game client is a typical network game program including a personal access module programmed to access the game server 650, a communication module programmed to perform chatting during the game, call information on a game item purchase list, an update module to update recent game items, a game playing and storing module used for performing games, and an item wearing module.

The site server 300 includes servers 310, 320, and 330 of sites for providing various services through the Internet 400, and represents the server of sites that provide services in cooperation with the site activity index applying system realized in the portal site 600.

The site activity index applying system connected to the user terminal 100 through the Internet 400 includes an interface server 610, an authentication server 620, a processing server 630, a database server 640, and a game server 650.

The database server 640 includes a user database 641, a site activity index database 642, a cyber money database 643, and a game database 644.

The user database 641 stores information on users who can receive the services through the site activity index applying system. For example, the user database 641 stores log-in IDs, passwords, user personal items (e.g., names, residential codes, addresses, and telephone numbers), and users' favorite fields.

The site activity index database 642 stores site activity index information assigned to the users. In detail, the site activity index database 642 stores accumulation information for indicating site activity indexes accumulated for respective users, and usage information for indicating usage histories of the accumulated site activity indexes.

In this instance, the accumulation information shows for which activity the user has received site activity indexes, for example, including site activity index accumulation types for respective users, accumulated site activity indexes, accumulation dates, and the total site activity indexes. Here, the accumulation type represents information that shows whether the user has received site activity indexes through a transaction, by viewing advertisements, by joining predetermined events, or by registering himself for cooperating sites or using services provided by the cooperating sites. According to this information, the site activity indexes are summed up for respective users, the site activity indexes are summed up for respective accumulation types, and the site activity indexes are referred to for respective accumulation dates.

Further, the usage information indicates the method by which the user used the site activity indexes. In this embodiment, the user can use them when exchanging the accumulated site activity indexes with game credits or using the service for an exclusive use of site activity indexes. Therefore, the usage information includes site activity index using types, used site activity indexes, and usage dates. According to this information, site activity indexes are summed up and referred to for the respective usage types, and site activity indexes are referred to for the respective usage dates. In this instance, the usage type indicates whether the user has used the site activity indexes to exchange them for game credits or has used them to use the service for an exclusive use of site activity indexes.

The site activity index database 642 stores information on the site activity indexes given to the user. In detail, the site activity index database 642 stores accumulation information for indicating accumulated site activity indexes for respective users and usage information for indicating usage histories of accumulated site activity indexes.

Also, the cyber money database 643 stores information on the cyber money possessed by respective users. In particular, it stores information on how much cyber money the users have for respective types of cyber money. For example, it stores information on types of accumulating cyber money, accumulated cyber money, accumulation dates, and the total cyber money according to the types of cyber money (e.g., poker money, GoStop game money, and Hoola money) for respective users.

The game database 644 stores information on game logics for controlling execution of games and game scores acquired by game winners.

The processing server 630 for performing a site activity index applying service based on the information stored in the database server 640 includes a service provider 631 for providing a plurality of services including transactions to the user, a site activity index provider 632 for assigning site activity indexes according to the user's joining state and degree on the service provided by the service provider 631, a cyber money provider 633 for providing cyber money to the user, a game credit converter 634 for converting the site activity indexes into game credits, and a game item buying unit 635 for buying game items by using the site activity indexes.

In this instance, the service provider 631 includes a transaction service unit 631-1 for buying and selling goods, an event provider 631-2 for providing a plurality of events including advertisements to the user, and a cyber money service unit 631-3 for providing exclusive services (e.g., games) using cyber money. In addition, the service provider 631 may provide other services (e.g., a service for an exclusive use of site activity indexes) that can be provided by the system on the network. Also, the goods for sale include any kind of goods (e.g., contents and products) that can be sold on the network.

The game credit converter 634 converts the site activity indexes into game credits so that the user may join the game, and the game item buying unit 635 controls the user to buy game items by using the site activity indexes so that the user may use the game item when joining the corresponding game.

The authentication server 620 registers membership of users to the system, authenticates members based on the information stored in the user database 641, and in particular, processes the users' logging in based on the information stored in the user database 641 and provides processed results to the processing server 630.

The interface server 610 controls the connection of the user terminals 100 through the Internet 400, converts various pieces of information provided by the respective servers into data of a predetermined communication rule, and provides the data to the user terminals 100, or receives information from the user terminals 100 through the Internet 400 and provides the information to the respective servers. The interface server 610 may include a database linker (e.g., a CUT) for transmitting and receiving information to/from a web server or another system. For example, when the interface server 610 is a web server, it provides various services including a chat service, a community service, and a shopping mall service as well as various Internet games to the user terminals 100 connected through the Internet. The interface server 610 may be a network computer system including a total solution for managing a web engine for managing the web site, membership management, game guild management, communities, and emails, and controls membership authentication and game item display.

In this embodiment, when a user registered as a member of the system inputs a URL for accessing the system while driving an Internet access program (e.g., a web browser) through a cable terminal (e.g., a PC), the URL information is converted by the hypertext transfer protocol (HTTP) in the web browser, and the converted information is then transmitted to the system through the Internet. Accordingly, the interface server 610 transmits a web page corresponding to the URL information to the user terminal 100, and the transmitted web page is converted and displayed in the window format on the web browser.

After this, when the user requests a membership to join the system, the authentication server 620 provides a membership joining screen to the user, and when the user inputs a plurality of information including an ID, the authentication server 620 registers the user as a member of the system. The authentication server 620 stores the corresponding user's information in the user database 641 to finish registration, and reports completion of membership joining to the user terminal 100. In this instance, a member level selected by the user can also be displayed. Therefore, the user who is a member of the site activity index applying system according to the embodiment of the present invention can use various services provided by the system.

The game server 650 is a game server program cooperating with the game client installed in the above-described user terminal 100, includes a TCP/IP-based default game module, a multi-user access module, a multi-user communication module, a game service unit, a member authenticator, and a database update module, and performs functions of authenticating members and providing game services to the game clients. The game server 650 provides various game services selected by the user through the channel server. That is, the game server 650 performs games according to game logics defined for respective games by referring to the game database 644.

In this embodiment of the present invention, the respective components of the processing server 630 are illustrated to be operable in the processing server 630, and in addition to this, they may be realized as independent servers to perform corresponding functions, and the database 640 is not restricted to the above-noted classification.

Figure 8:
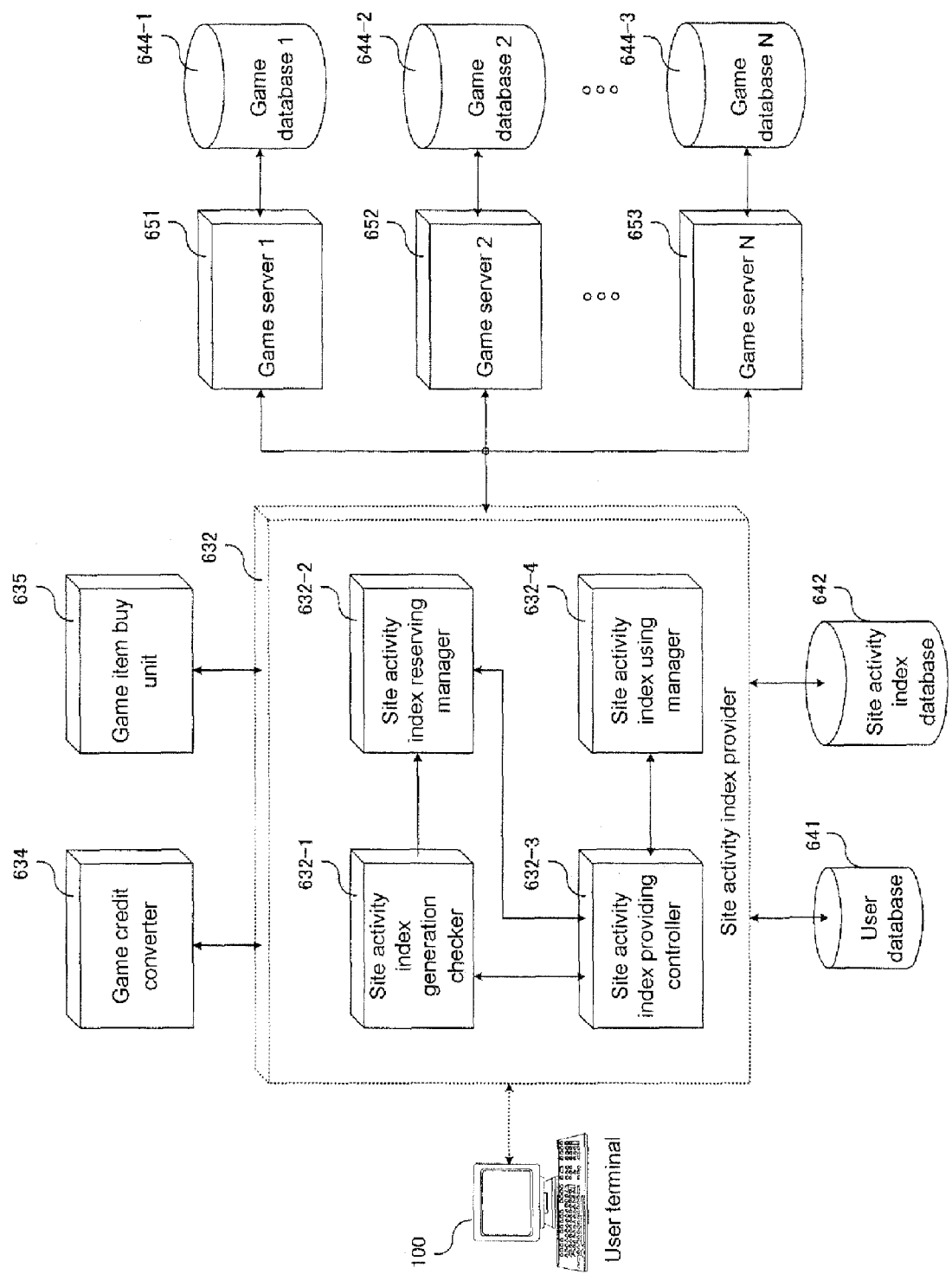
FIG. 8 shows a detailed schematic diagram of a site activity index provider of a site activity index applying system according to an embodiment of the present invention.

FIG. 8 shows a detailed schematic diagram of a site activity index provider of the site activity index applying system according to an embodiment of the present invention. The site activity index provider 632 includes a site activity index generation checker 632-1, a site activity index reserving manager 632-2, a site activity index providing controller 632-3, and a site activity index using manager 632-4, and it controls application of site activity indexes in cooperation with the game servers 651, 652, and 653, the game databases 644-1, 644-2, and 644-3, the game credit converter 634, and the item buying unit 635.

Referring to FIG. 8, the site activity index generation checker 632-1 monitors in real-time whether the user accesses the portal site 600 according to this embodiment of the present invention and generates site activity indexes. When the site activity indexes are generated, the site activity index reserving manager 632-2 stores the generated site activity indexes in the site activity index database 642.

The site activity index using manager 632-4 takes site activity indexes from the site activity index database 642 and controls the user to join a game or buy a game item when the user desires to use the reserved site activity indexes so as to join the game of the portal site or buy the game item.

The site activity index providing controller 632-3 controls the operations of the site activity index generation checker 632-1, the site activity index providing controller 632-3, and the site activity index using manager 632-4 in cooperation with the game servers 651, 652, and 653, the game databases 644-1, 644-2, and 644-3, the game credit converter 634, and the game item buying unit 635 so that the user may join the game or buy the game item by using the site activity indexes.

Figure 9:
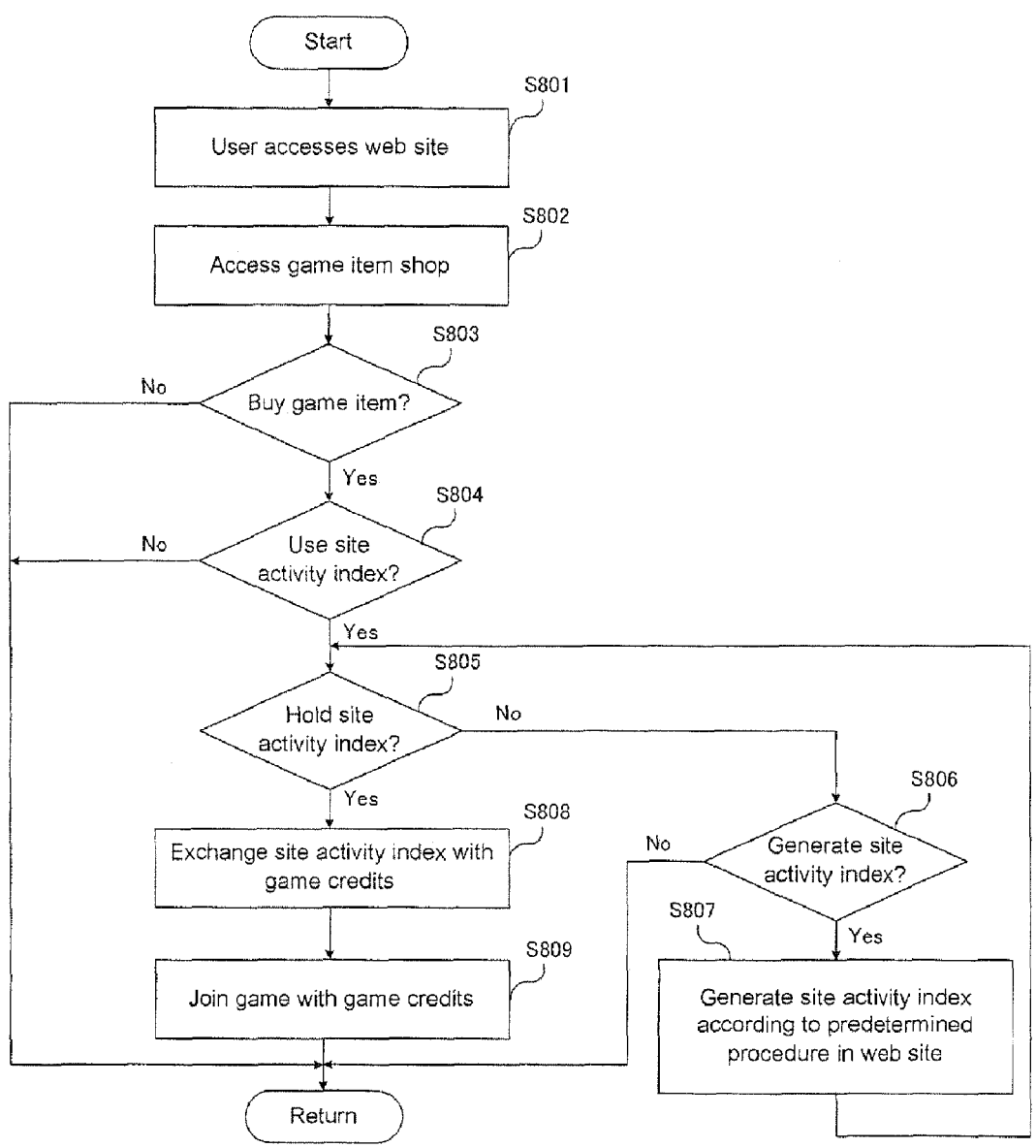
FIG. 9 shows a method for buying a game item by using the site activity index according to an embodiment of the present invention.

FIG. 9 shows a method for buying a game item by using the site activity index according to an embodiment of the present invention.

Referring to FIG. 9, as to the method for buying a game item by using the site activity index, when the user desires to access the web site 600 through the Internet 400 by using a user terminal 100, he is connected to the web site 600 through the interface server 610 in step S801.

When the user accesses a game item shop in step S802, it is checked whether the user wishes to buy a game item in step S803, and when he is found to desire to buy one, he is controlled whether to select usage of site activity indexes in the case of buying the game item in step S804. In this instance, the game item may include a function for charging and restoring game money, a function for reinforcing power of avatars, and a function for attacking or defending other garners.

When the user selects to use the site activity indexes to buy the game item, it is checked whether the user possesses site activity indexes in step S805, and when the user possesses no site activity indexes, it is checked whether the user desires to generate site activity indexes in step S806, and the site activity indexes are generated according to a predefined process in the web site in step S807. In this instance, the generation and reserve of the site activity indexes are given according to the user's activities as described above.

Next, when the user possesses the site activity indexes, he buys a game item by using the site activity indexes in step S808, and he can join the corresponding game with the purchased game item in step S809.

Figure 10:
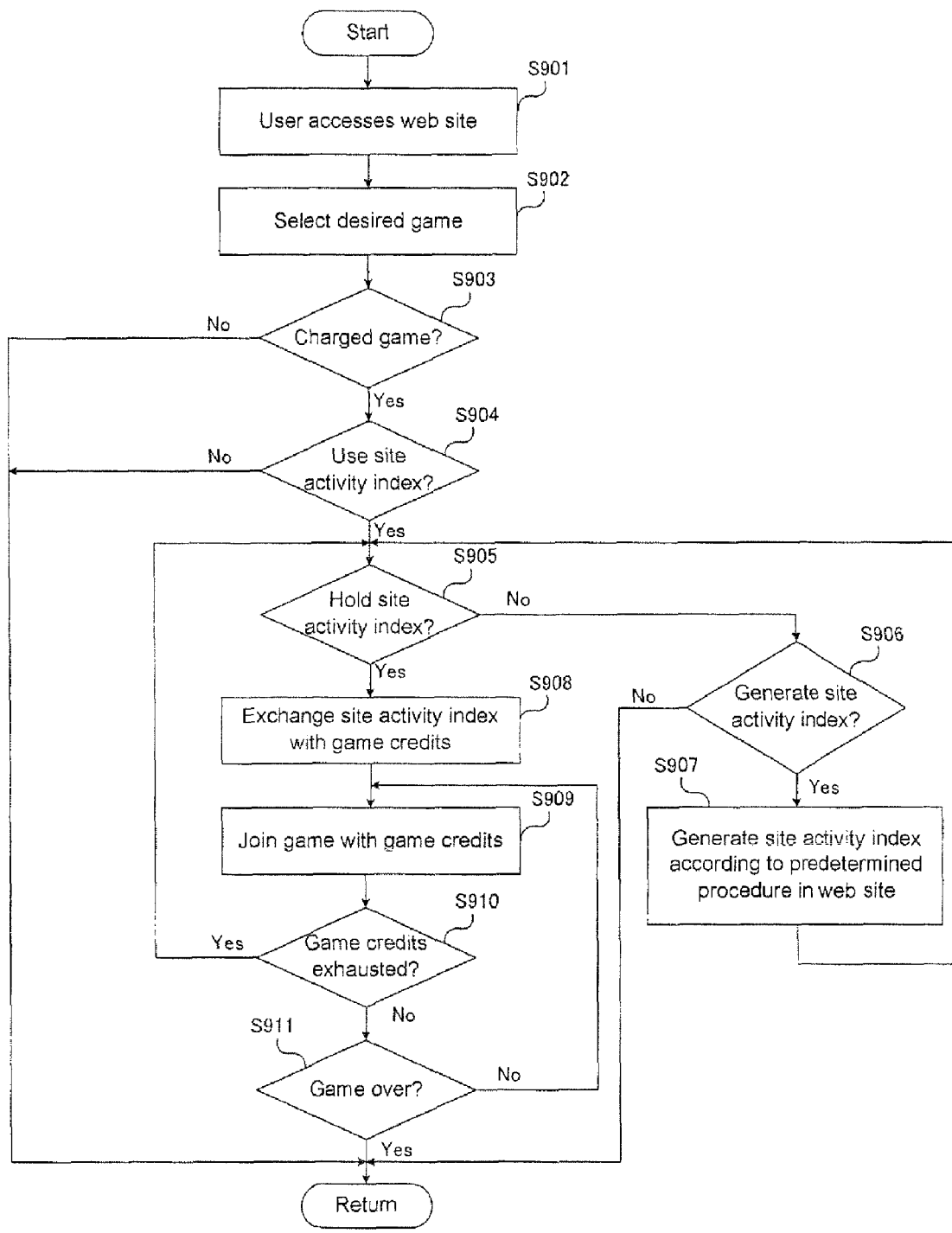
FIG. 10 shows a method for joining a game with the site activity index according to an embodiment of the present invention.

FIG. 10 shows a method for joining a game with the site activity index according to an embodiment of the present invention.

Referring to FIG. 10, as to the method for joining a game with the site activity index, when a user desires to access the web site 600 through the Internet 400 by using a user terminal 100, he is connected to the web site through the interface server 610 in step S901.

When the user accesses the game server 650 and selects a corresponding game in step S902, it is checked whether the game selected by the user is a charged game in step S903, and when it is found to be a charged game, it is selected whether to use site activity indexes to access the charged game in step S904. In this instance, when the game selected by the user is not a charged game or it is selected not to use site activity indexes, the existing method is processed. For example, the user can use his game money or game credits, or can join the charged game after converting cyber money into game money.

When the user selects to use the site activity indexes in the charged game, it is checked whether the user possesses the site activity indexes in step S905, and when the user possesses no site activity indexes, it is checked whether the user desires to generate site activity indexes in step S906, and the site activity indexes are generated according to a predefined rule in the web site in step S907. In this instance, as described above, the site activity indexes are generated and reserved according to the user's activities.

Next, when the user possesses site activity indexes, the site activity indexes are converted into game credits or game money in step S908, and the user joins the corresponding game by using the converted game credits in step S909.

It is checked whether the converted game credits or the game money are exhausted in step S910, and when one of them is exhausted, the above-described steps S905 to S909 are repeated. Also, when the game credits are exhausted, they are converted from the site activity indexes for each game.

Next, when the converted game credits or game money are not exhausted, the user selects whether to continue to join the game in step S911. That is, it goes to the previous step of S909 when he does not desire to finish the game, and the game is over in the other case.

As a result, the site activity index using service is restricted to games, conversion of the site activity indexes into various types of game money or game items is allowed, services other than the game available for reserving the site activity indexes can be reinforced, and hence, external events can be performed more efficiently.

The game items or the game credits acquired by exchanges with the site activity indexes can only be exchanged with the site activity indexes and they cannot be exchanged with cyber money or game money other than the site activity indexes.

While this invention has been described in connection with exemplary embodiments, it is to be understood that the invention is not limited to these embodiments, but, on the contrary, is intended to cover various modifications and equivalent arrangements included within the spirit and scope of the appended claims.

According to the present invention, loyalty and concentration on the game by users are increased and requirements for the site activity indexes to be used with the game are increased since users generally enjoy games with access via the charge-free site activity indexes. Also, the site activity indexes can substantially be chargeable by using paid services from which the user can acquire a large amount of site activity indexes.

Further, according to the present invention, means other than cash applicable to various methods (e.g., game money, items, and credits) for using charged games are provided to thereby increase convenience of garners within the site.

Also, the present invention is applicable to activation of new games since means other than cash are provided when the new games having chargeable components are introduced.

In addition, the present invention is applicable to all the activities in the site including charge-free activities and is thus applicable to acquisition of reserves, and it can be used for marketing new activities in the site.

The invention claimed is:

1. A method for applying site activity indexes by a site activity index applying system connected to a plurality of user terminals through the Internet, the method comprising:

determining whether a user desires to buy a game item for use in a game provided on a web site;

determining whether to use the user's site activity indexes so as to buy the game item;

determining whether the user possesses the site activity indexes; and exchanging the site activity indexes with one or more game items in response to a determination that the user possesses the site activity indexes, wherein the site activity indexes comprise numerical activity indexes provided to the user according to the user's activities on the web site, and wherein the user's activities for providing the site activity indexes comprise at least one of a transaction activity on the web site, an activity for viewing advertisements in the web site, an activity for joining events in the web site, an activity for transmitting or receiving mail through the web site, and an activity for logging in to the web site.

2. The method of claim 1, wherein the exchanging the site activity indexes with one or more game items comprises:

checking whether to generate new site activity indexes in response to a determination that the user possesses no site activity indexes;

generating site activity indexes according to the user's activities in the web site in response to a determination that the user desires to generate site activity indexes; and exchanging the generated site activity indexes with game items.

3. The method of claim 1, wherein the site activity indexes further comprise game scores acquired through games, and numerical indexes of degrees for using charged/non-charged services, and wherein the user's activities for providing the site activity indexes further comprise an activity for joining web sites cooperating with and other than the web site as a member, and an activity for using services of the cooperating web sites.

4. A method for applying site activity indexes by a site activity index applying system connected to a plurality of user terminals through the Internet, the method comprising:

determining whether a user selects joining a charged game provided on a website;

determining whether to use the user's site activity indexes so as to join the charged game;

determining whether the user possesses the site activity indexes;

converting the site activity indexes into game credits in response to a determination that the user possesses the site activity indexes; and enabling the user to join the selected game with the converted game credits, wherein the site activity indexes comprise numerical activity indexes provided to the user according to the user's activities on the web site, and wherein the user's activities for providing the site activity indexes comprise at least one of a transaction activity on the web site, an activity for viewing advertisements in the web site, an activity for joining events in the web site, an activity for transmitting or receiving mail through the web site, and an activity for logging in to the web site.

5. The method of claim 4 further comprising: converting the site activity indexes into game credits for each game in response to the game credits being exhausted.

6. The method of claim 4 wherein converting the site activity indexes into game credits comprises:

determining whether to generate new site activity indexes in response to the user possessing no site activity indexes;

generating site activity indexes according to the user's activities on the web site in response to a request of the user to generate site activity indexes; and converting the generated site activity indexes into game credits.

7. The method of claim 4 wherein the site activity indexes comprise at least one of numerical activity indexes provided for free to the user according to the user's activities on the web site, game scores acquired through games, and numerical indexes of degrees for using charged/non-charged services.

8. The method of claim 7, wherein the user's activities for providing the site activity indexes comprise at least one of a transaction activity on the web site comprising settlement, an activity for viewing advertisements on the web site, an activity for joining events on the web site, an activity for joining web sites cooperating with the web site as a member, an activity for using services of the cooperating web sites, an activity for transmitting and receiving mail through the web site, and an activity for logging in by the user to the web site.

9. The method of claim 4 wherein the site activity indexes further comprise game scores acquired through games, and numerical indexes of degrees for using charged/non-charged services, and wherein the user's activities for providing the site activity indexes further comprise an activity for joining web sites cooperating with and other than the web site as a member, and an activity for using services of the cooperating web sites.

10. A system for applying site activity indexes, the system being connected to a plurality of users through the Internet and comprising:

a service provider server configured to provide a plurality of services comprising transactions to the users;

a site activity index provider server configured to provide site activity indexes according to the users' activity results of using the services;

a game server configured to execute a game provided on a web site according to game logics defined for the game;

a database server configured to store information on the users, the site activity indexes, and the game;

a game item buying unit configured to enable the users to buy a game item used in the game provided by the game server by using the site activity indexes; and a non-transitory computer-readable storage medium to store the site activity indexes, wherein the site activity indexes comprise numerical activity indexes provided to the user according to the user's activities on the web site, and wherein the user's activities for providing the site activity indexes comprise at least one of a transaction activity on the web site, an activity for viewing advertisements in the web site, an activity for joining events in the web site, an activity for transmitting or receiving mail through the web site, and an activity for logging in to the web site.

11. The system of claim 10, wherein the site activity index provider server comprises:

a site activity index generation checker configured to monitor whether the users access the web site and configured to generate site activity indexes;

a site activity index reserving manager configured to store the generated site activity indexes in a site activity index database in response to the site activity indexes being generated;

a site activity index using manager for configured to retrieve the site activity indexes from the site activity index database and configured to enable the users to buy the game item in response to a request of the users to use the retrieved site activity indexes so as to join a game in the web site; and a site activity index providing controller connected to the game server and the game item buying unit and configured to manage, store, and process the site activity indexes so that the users join the game.

12. The system of claim 11 further comprising a game credit converter configured to convert the site activity indexes into game credits in response to one of the users joining a charged game.

13. The system of claim 10 further comprising: a game credit converter configured to convert the site activity indexes into game credits in response to one of the users joining a charged game.

14. The system of claim 10 wherein the database comprises:

a user database for storing member information of the users;

a site activity index database for storing site activity index information comprising site activity indexes accumulated for the respective users; and a game database for storing information on the game logics for controlling execution of the game by the game server and game scores acquired by game winners according to game results.

15. The system of claim 10 wherein the site activity indexes further comprise game scores acquired through games, and numerical indexes of degrees for using charged/non-charged services, and wherein the user's activities for providing the site activity indexes further comprise an activity for joining web sites cooperating with and other than the web site as a member, and an activity for using services of the cooperating web sites.

16. A non-transitory computer-readable storage medium comprising an executable program which when executed, causes performance of the following steps:

determining whether a user desires to buy a game item for use in a game provided on a web site;

determining whether to use the user's site activity indexes so as to buy the game item;

determining whether the user possesses the site activity indexes; and exchanging the site activity indexes with one or more game items in response to a determination that the user possesses the site activity indexes, wherein the site activity indexes comprise numerical activity indexes provided to the user according to the user's activities on the web site, and wherein the user's activities for providing the site activity indexes comprise at least one of a transaction activity on the web site, an activity for viewing advertisements in the web site, an activity for joining events in the web site, an activity for transmitting or receiving mail through the web site, and an activity for logging in to the web site.

17. The method of claim 16, wherein the site activity indexes further comprise game scores acquired through games, and numerical indexes of degrees for using charged/non-charged services, and wherein the user's activities for providing the site activity indexes further comprise an activity for joining web sites cooperating with and other than the web site as a member, and an activity for using services of the cooperating web sites.

18. A non-transitory computer readable storage medium comprising an executable program which when executed, causes performance of the following steps:

determining whether a user selects joining a charged game provided on a web site;

determining whether to use the user's site activity indexes so as to join the charged game;

determining whether the user possesses the site activity indexes;

converting the site activity indexes into game credits in response to a determination that the user possesses the site activity indexes; and enabling the user to join the selected game with the converted game credits, wherein the site activity indexes comprise numerical activity indexes provided to the user according to the user's activities on the web site, and wherein the user's activities for providing the site activity indexes comprise at least one of a transaction activity on the web site, an activity for viewing advertisements in the web site, an activity for joining events in the web site, an activity for transmitting or receiving mail through the web site, and an activity for logging in to the web site.

* * * * *